United States Patent [19]

Funabashi et al.

[11] Patent Number: 4,564,930
[45] Date of Patent: Jan. 14, 1986

[54] DISC CARRYING SYSTEM

[75] Inventors: Tadashi Funabashi; Junji Takahashi; Kyoichi Kato, all of Tokorozawa, Japan

[73] Assignee: Pioneer Electronic Corporation, Tokyo, Japan

[21] Appl. No.: 515,196

[22] Filed: Jul. 19, 1983

[30] Foreign Application Priority Data

Jul. 20, 1982 [JP] Japan .......................... 57-109771[U]
Jul. 20, 1982 [JP] Japan .......................... 57-109772[U]

[51] Int. Cl.$^4$ ........................ G11B 1/00; G11B 17/04; G11B 25/04
[52] U.S. Cl. .................................... 369/75.2; 369/270
[58] Field of Search ....................... 369/75.2, 265, 270

[56] References Cited

U.S. PATENT DOCUMENTS

| 4,337,533 | 6/1982 | Ando et al. | 369/265 |
| 4,347,596 | 8/1982 | Abe et al. | 369/75.2 |

FOREIGN PATENT DOCUMENTS

| 26152 | 4/1981 | European Pat. Off. | 369/75.2 |
| 58167 | 5/1981 | Japan | 369/75.2 |
| 58168 | 5/1981 | Japan | 369/75.2 |

Primary Examiner—Steven L. Stephan
Attorney, Agent, or Firm—Fleit, Jacobson, Cohn & Price

[57] ABSTRACT

A disc carrying system is mounted in a disc player of the front loading type and serves to support a disc that will be performed at a predetermined location on a disc supporting surface and to carry the disc to a predetermined performance location by moving the disc horizontally and vertically. This system comprises: a horizontally slidable tray for positioning the disc; a container which can project outside of the player housing together with the tray and which supports the disc in cooperation with the tray; at least a pair of horizontally movable cam members having cam holes adapted to engage the container; and a motor to drive the cam members. The cam holes are formed so as to vertically move the container in association with the horizontal movement of the cam members. Two concave portions are formed in the tray at predetermined locations corresponding to the periphery of the disc when it has been mounted on the disc supporting surface. By inserting the thumb or any two fingers in these concave portions, the disc may be easily removed from the tray. This disc carrying system cam provide an automatic disc loading operation by means of a simple constructional cam mechanism, and troubles will not readily occur.

9 Claims, 13 Drawing Figures

DISC CARRYING SYSTEM

BACKGROUND OF THE INVENTION

The present invention relates to a disc carrying system, and more particularly to a disc carrying system for automatically carrying a disc to a fixed performance location in a disc player of the front loading type.

Conventionally, a development of an automatic disc loading apparatus is demanded for the use of a player which plays back music or video information signals recorded on a digital audio disc or a video disc.

SUMMARY OF THE INVENTION

It is therefore an object of the present invention to provide a disc carrying system which can automatically carry a disc enclosed in a player housing (after the disc has been placed on a pullout-type tray which is drawably provided in the player housing) to the performance location with a simple construction.

Another object is to provide a disc carrying system in which a disc can be easily placed on the pullout-type tray and after completion of performance, the disc can be easily removed from the tray.

According to the present invention, the above objects are accomplished by a disc carrying system which is provided in a housing of a front loading disc player and which comprises: a device for supporting a disc to be played back at a fixed location; a device for moving the disc to a first predetermined direction and a second predetermined direction perpedicular thereto, thereby carrying the disc to a fixed performance location; a pullout-type tray slidably provided in the first direction for positioning the disc to the fixed location; a container which can protrude outside of the housing together with the tray and which supports the disc in cooperation with the tray; at least a pair of cam members which have cam slots adapted to come into engagement with the container and which are provided so as to freely move in the first predetermined direction; and a drive device for driving the cam members, wherein the cam holes are formed for allowing the container to move in the second predetermined direction with the movement of the cam members in the first predetermined direction.

The disc carrying system according to the present invention has such another specific feature that the disc supporting portion is formed with at least one concave portion with a predetermined size at the position corresponding to the peripheral portion of the disc when it has been placed and supported on the fixed supporting surface of the pullout-type tray in the container, thereby allowing the disc to be easily loaded on and unloaded from the tray, so that attachment of dust and dirt on the information recording surface of the disc is prevented.

The present invention is best understood by reference to the accompanying drawings.

DETAILED DESCRIPTION OF THE PREFERRED EMBODIMENTS

Figure 1:
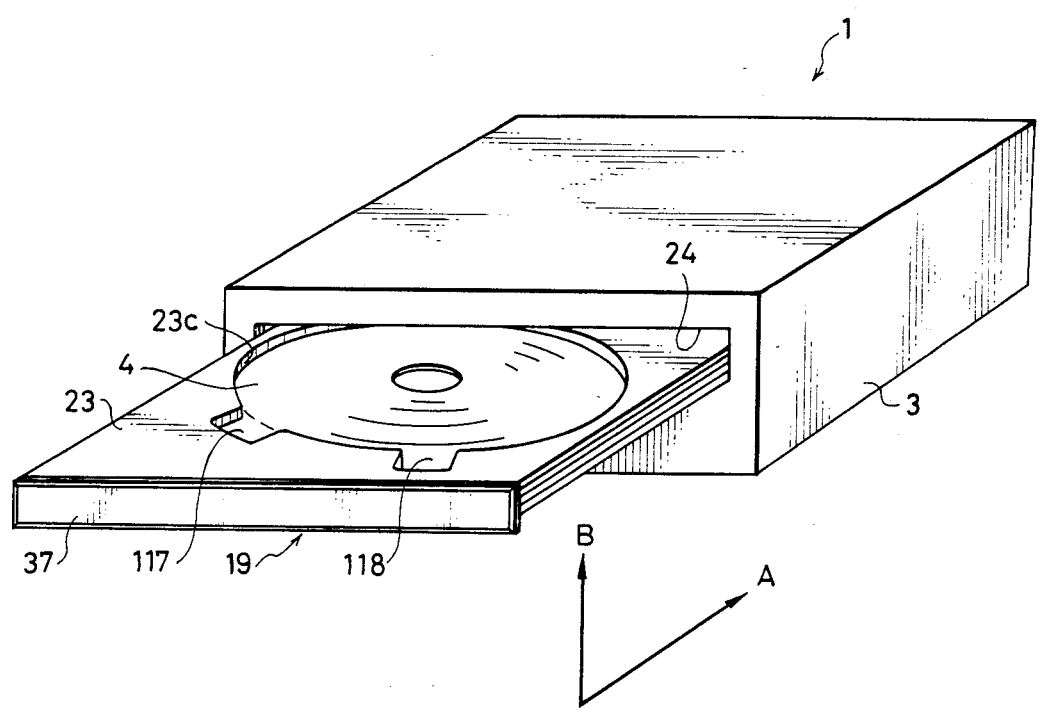
FIG. 1 is a schmatic perspective view illustrating an entire profile of a disc player of the front loading type according to the present invention.

An embodiment of the front loading disc player according to the present invention will now be described hereinbelow with reference to the drawings, wherein the same parts and elements and components are designated by the same reference numerals throughout the drawings.

In the drawings, a main body 1 of the front loading disc player according to the present invention is shown. A chassis 2 is attached to a housing 3 of the main body 1 of the disc player. A reference numeral 4 indicates a disc such as a digital audio disc, video disc, or the like. The chassis 2 is formed with a substantially circular opening portion 2a, a portion of which communicates with a longitudinal hole portion 2b. A turntable 6 to be driven and rotated by a driving motor 5 is inserted into this opening portion 2a. As will be obvious particularly in FIG. 8, the turntable 6 comprises: a substantially dish shaped disc supporting member 7 attached to an output shaft 5a of the driving motor 5; a supporting member 9 made of a magnetic material which is attached to the end portion of the output shaft 5a and to which a ring magnet 8 is fixedly attached, thereby constituting a magnetic circuit; a sliding member 10 provided between the disc supporting member 7 and the supporting member 9 so as to be slidably attached to the output shaft 5a; a coil spring 11 for applying a predetermined upward (in the direction indicated by an arrow B in FIG. 8) bias force to the sliding member 10; a cup spring 13 fixed to the disc supporting member 7 coaxially therewith by means of a fixing member 12; and a plurality of rubber members 14 which are almost coaxially arranged and adhered onto the peripheral surface of the cup spring 13. A concave portion 9a is formed at the rotational center of the supporting member 9. The sliding member 10 is formed at its periphery with a tapered portion 10a for positioning the center of the disc 4 by being inserted into a central hole 4a in the disc 4. The longitudinal hole portion 2b is provided because the front loading disc player of the present embodiment is constructed in such a manner that the disc 4 and a pick-up device for reading out information signals, such as a laser pickup (not shown), which constitutes a part of a disc performing apparatus together with the driving motor 5 and turntable 6, are positioned on both sides of the chassis 2.

The disc carrying system acts to carry the disc 4 on the turntable 6 which is also a part of the performing apparatus. As will be clearly understood, particularly from FIGS. 2 to 4, the disc carrying system comprises: a pullout-type tray 23 provided in the housing so as to slidably move forward and backward (in the direction indicated by an arrow A) by making its groove portions 23a engagable with guide rollers 22, which are rotatably mounted around supporting devices 21 on both sides of the chassis 2; a substantially flat, plate-like container 25 which constitutes a disc supporting portion 19 together with the tray 23 and is able to protrude to the outside of the housing 3 from an inserting hole 24 formed in the housing 3 and which is adapted to support the disc 4 in cooperation with the tray 23; a pair of cam members 28 and 29 which are attached to the tray 23 so as to freely move in both forward and backward direction in a predetermined range by making each of a pair of pin members 26 and 27 fixed to projecting portions 28a and 29a, which pins are attached, respectively, on both side walls of the container 25 insert, through two pairs of longitudinal guide holes 23b formed at fixed positions of the tray 23; and a cam driving device 30 for driving the cam members 28 and 29.

The cam driving device 30 comprises: a link portion 31 attached to the rear side of the tray 23; and power supplying device 32 fixed to a predetermined location on the chassis 2 for supplying the power to the link portion 31 by engaging the link poriton 31. The link portion 31 along with the cam members 28 and 29 constitutes a link mechanism.

A container driving apparatus comprises: a detecting system 35 for generating a detection signal to power supplying device 32 by detecting that the disc supporting portion 19 has been enclosed in the housing 3; and the link mechanism and the power supplying device 32. The container driving apparatus also includes inhibition means (not shown) for inhibiting the movement of the container 25 until the disc supporting portion 19 is enclosed in the housing 3.

A piercing hole 23c having an inside diameter slightly larger than the outside diameter of the disc 4 is formed at substantially the central portion of the tray 23 to position the disc 4 by inserting it through the hole 23c. A knob plate 37 is formed on the end portion of the tray 23 and a receiving portion 38 adapted to abut on this knob plate is formed in the inserting hole 24 of the housing 3.

Figure 3:
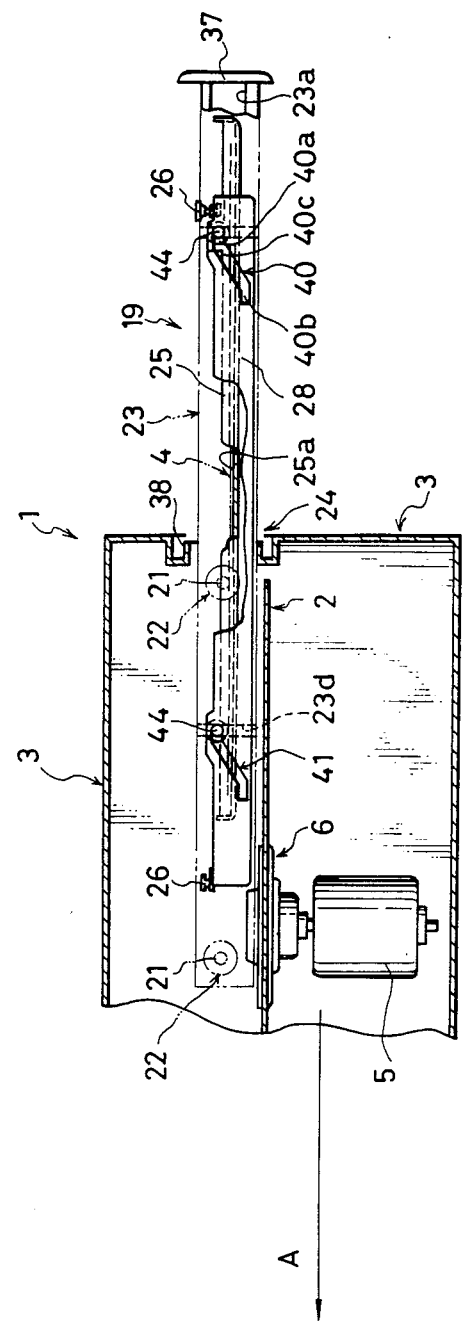
FIG. 3 is a left side elevational view with a part cut away of the internal construction of FIG. 2.
Figure 4:
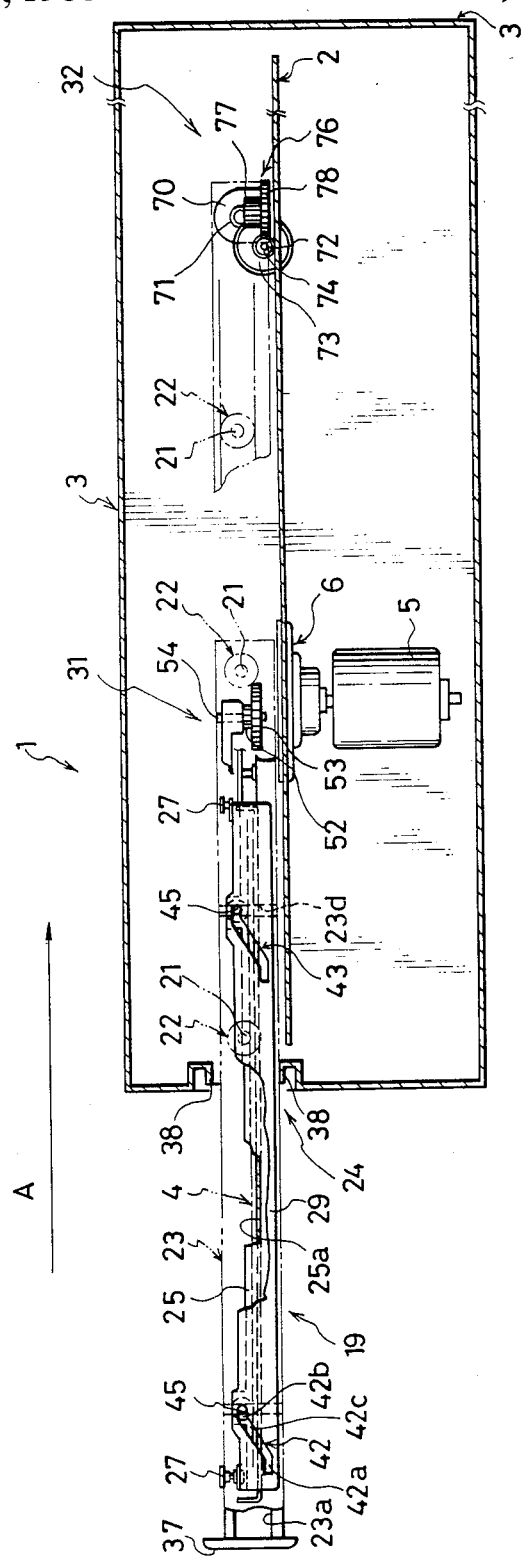
FIG. 4 is a right side elevational view with a part cut away of the internal construction of FIG. 2.
Figure 5:
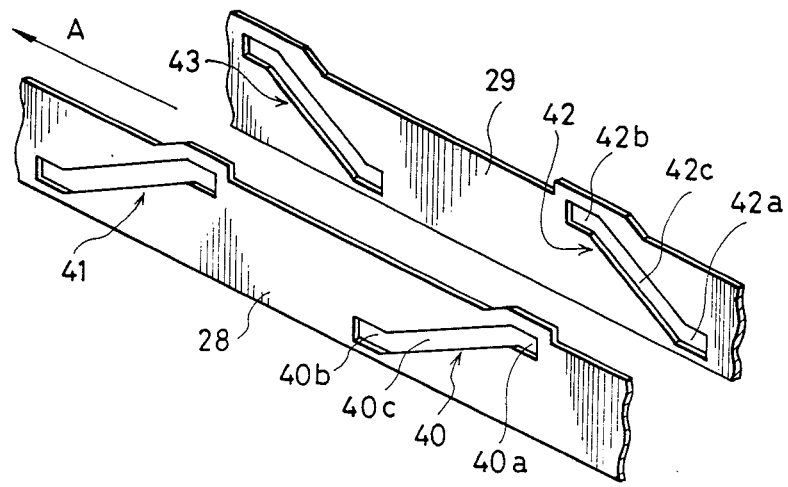
FIG. 5 is a perspective view illustrating cam members.

As shown in FIGS. 3 to 5, a pair of cam slots 40 and 41 are formed in each of the fixed positions at the front and rear portions of the first cam member 28 between a pair of cam members 28 and 29. As specifically illustrated in FIG. 5, the cam slot 40 comprises: horizontal portions 40a and 40b which are parallel to the moving direction of the first cam member 28 respectively; and a slant portion 40c which is continuously communicating with both horizontal portions 40a and 40b and which inclines downward from the forward to backward portions. The cam slot 41 is also formed in the same manner as the cam slot 40 and is spaced some distance apart from the rear portion of the cam slot 40. On the other hand, a pair of cam holes 42 and 43 are formed in each of the fixed positions at the front and rear portions of the second cam member 29. The cam slot 42 comprises: horizontal portions 42a and 42b which are parallel to the moving direction of the second cam member 29, respectively; and a slant portion 42c which is continuously communicating with the horizontal portions 42a and 42b and which inclines upward from the forward to backward portions. The cam slot 43 is also formed in the same way as the cam hole 42 and is spaced some distance apart from the rear portion of the cam slot 42.

Figure 6:
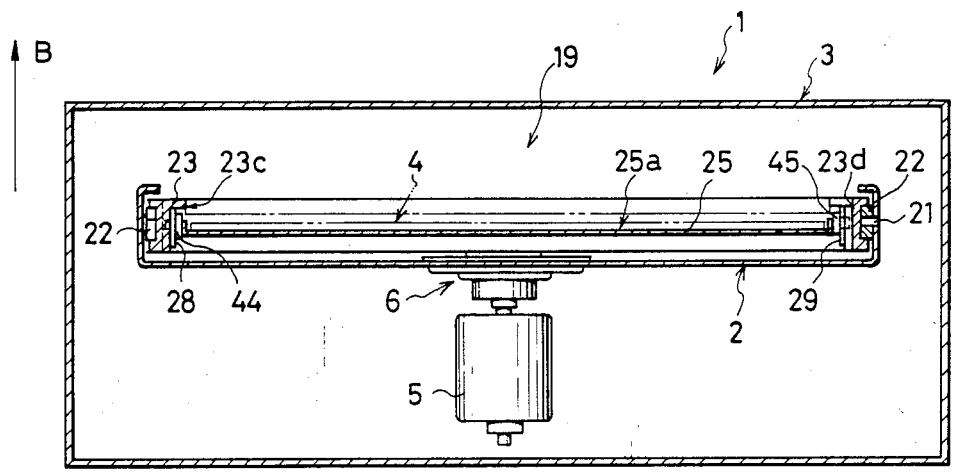
FIG. 6 is a front view with a part cut away of the internal construction of FIG. 2.

As will be obvious from FIG. 6, the container 25 is arranged so as to be mounted in the tray 23 in such a manner that disc supporting surface 25a for supporting the disc 4, which has been inserted into the piercing hole 23c in the tray 23, faces the lower surface of the tray 23. A pair of engaging members 44 and 45 as shown in FIGS. 2 to 4, and 5 are fixedly mounted to both end portions on the right and left sides toward the rear portion in the direction (indicated by the arrow A) of the container 25. The engaging member 44 at the left end portion is inserted into the cam slots 40 and 41 of the first cam member 28 and is slidably mounted into grooves 23d which are vertically and elongatedly formed in the inner surfaces on both right and left sides of the tray 23 (refer to FIGS. 2 to 4, and 6). The engaging member 45 at the right end portion is inserted into the cam slots 42 and 43 of the second cam member 29 and is slidably mounted into the grooves 23d.

Figure 2:
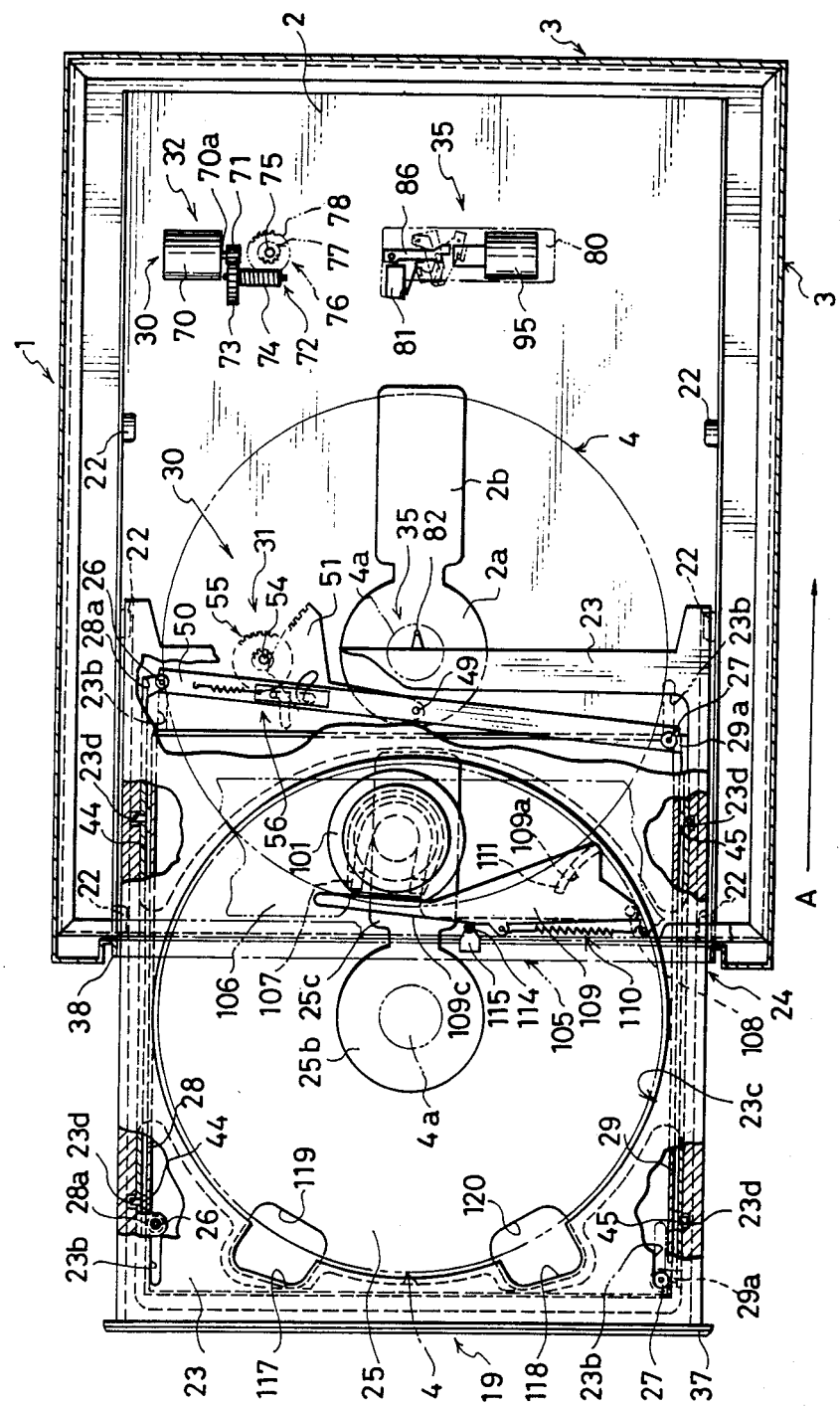
FIG. 2 is a plan view illustrating the internal construction of the front loading disc player of FIG. 1.

As shown in FIG. 2, the container 25 is formed with a substantially circular opening portion 25b adapted to be inserted by the turntable 6 and a longitudinal hole portion 25c, the left portion of which communicates with the opening portion 25b. The longitudinal hole portion 25c is formed because the container 25 located between the disc 4 and the information readout pick-up device (not shown) as previously mentioned, which constitutes a portion of the disc performing apparatus together with the driving motor 5 and turntable 6 is similar to the longitudinal hole portion 26 formed in the chassis 2.

Figure 10:
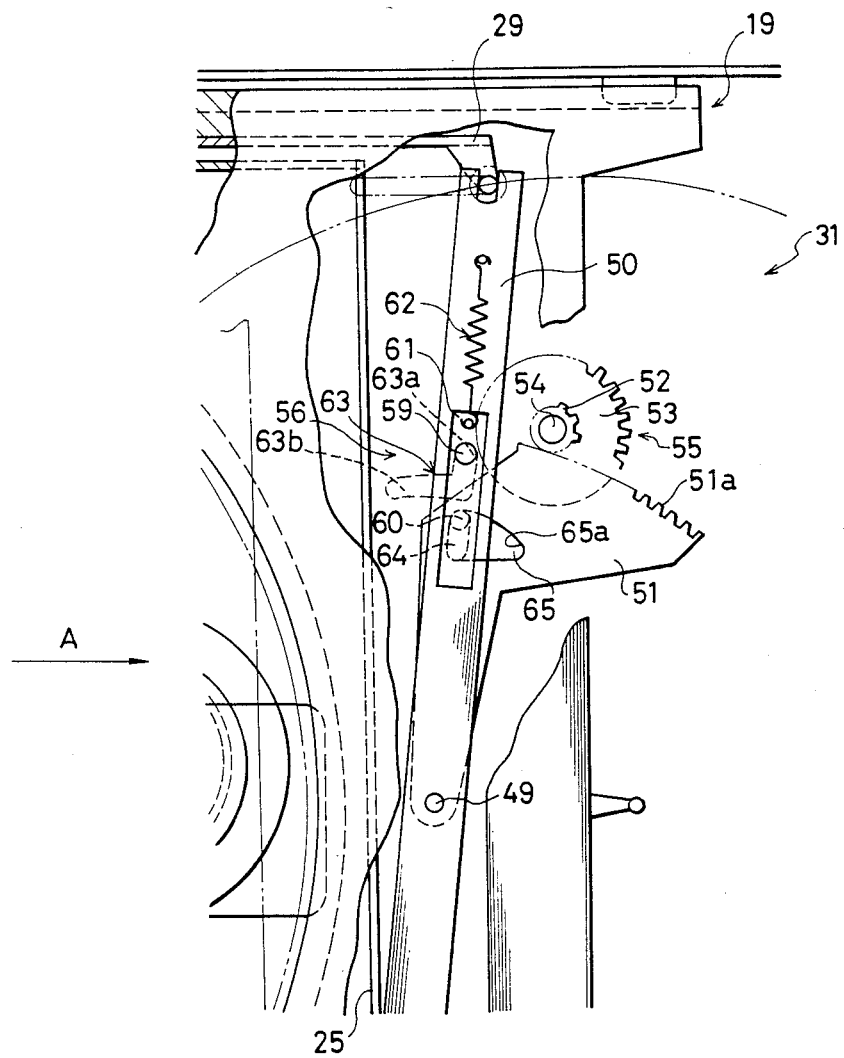
FIG. 10 is a diagram illustrating a link portion.

As illustrated in detail in FIGS. 2 and 10, the link portion 31 comprises: a longitudinal member 50 which is rotatably supported at substantially central portion by means of a supporting device 49 provided in the tray 23; a swinging member 51, one end thereof being supported so as to freely oscillate by the supporting device 49; a double gear 55 which has a small gear part 52 and a large gear part 53 and is rotatably supported by means of a supporting device 54 provided in the tray 23; and a locking mechanism 56 included in the inhibition means (not shown) mentioned previously for locking the operation of the link portion 31. The longitudinal member 50 engages at its both ends the pin members 26 and 27 which are provided at the rear end portions of the pair of cam members 28 and 29. The swinging member 51 is formed with a gear portion 51a adapted to engage the small gear part of the double gear 55.

Figure 11:
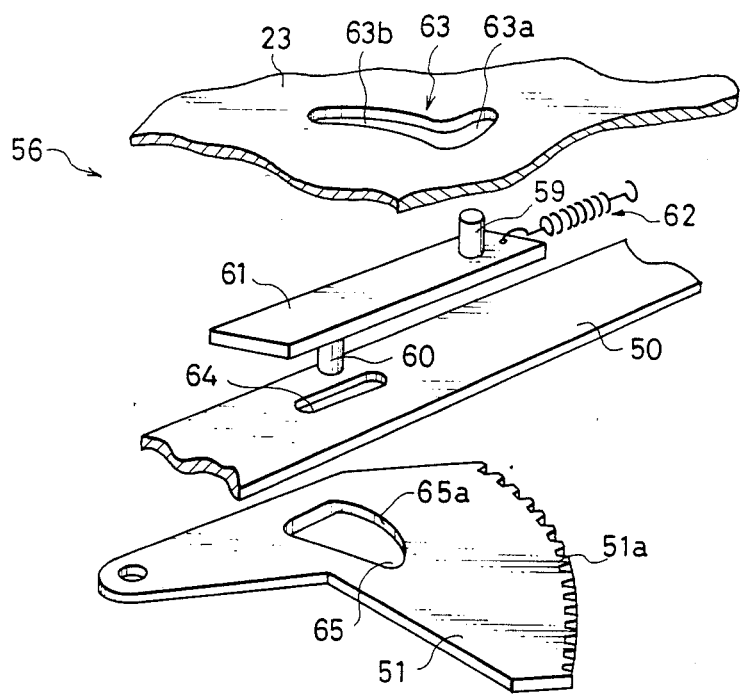
FIG. 11 is a schematic perspective view illustrating the structure of the locking mechanism.

Referring to FIG. 11 in particular, it can be seen that the locking mechanism 56 comprises: a flat plate-like movable member 61 which is formed with spaced columnar projections 59 and 60 on its upper and lower surfaces respectively and which is movably mounted in the longitudinal direction of the longitudinal member 50; a coil spring 62 for applying the longitudinal load (i.e. upward load in FIG. 10) to the movable member 61, one end of the spring 62 being coupled to near the edge of the movable member 61 on the side of the columnar projection 59, and the other end being coupled to the longitudinal member 50; a substantially L-shaped through hole 63 which is formed at a predetermined location of the tray 23 and through which the columnar projection 59 is inserted; a through hole 64 which is formed in the longitudinal member 50 substantially parallel to the longitudinal direction of the longitudinal member 50 and through which the columnar projection 60 is inserted; and a substantially fan-like cam hole 65 which is formed in the swinging member 51 and into which the columnar member 60 which protrudes from the through hole 64, is inserted and which has cam surface 65a adapted to abut on the columnar member 60.

As illustrated in detail in FIGS. 10 and 11, the substantially L-shaped through hole 63 comprises: a short-length portion 63a which is substantially parallel to the longitudinal direction of the longitudinal member 50 when the link portion 31 is in the still condition; and a long-length portion 63b formed in such a manner that the columnar member 59 is movable in association with the rotation of the longitudinal member 50 around the supporting device 49.

As distinctly shown particularly in FIGS. 2 and 4, the power supplying device 32 comprises: a driving motor 70 fixedly mounted to the chassis 2; a first spur gear 71 attached to an output shaft 70a of the driving motor 70; a second spur gear 73 rotatably supported by a supporting device 72 fixedly attached to the chassis 2 for engaging the first spur gear 71; a worm gear 74 which is rotatably suported by the supporting device 72 and which is fixedly attached to or integrally formed with the second spur gear 73; and a double gear 76 rotatably supported by a supporting device 75 fixedly attached to the chassis 2. The double gear 76 comprises: a small gear part 77 adapted to engage the large gear part 53 of the double gear 55 of the link portion 31 when the disc supporting portion 19 is enclosed in the housing 3; and a large gear part 78 adapted to engage the worm gear 72.

Figure 9A:
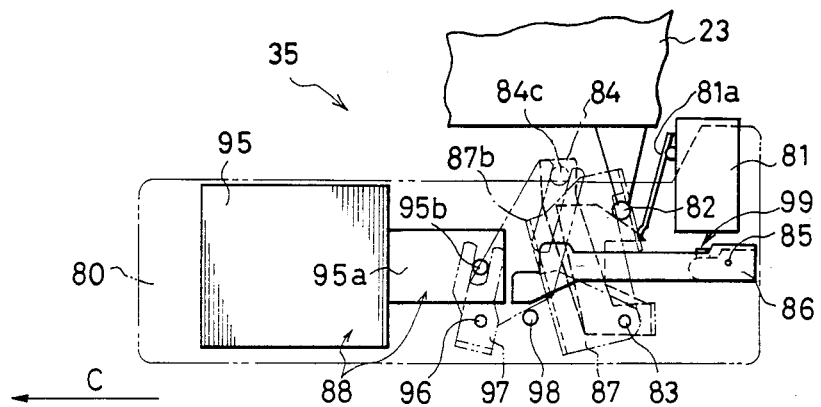
FIGS. 9A and 9B are a plan view and a side elevational view of a detecting mechanism, respectively.
Figure 9B:
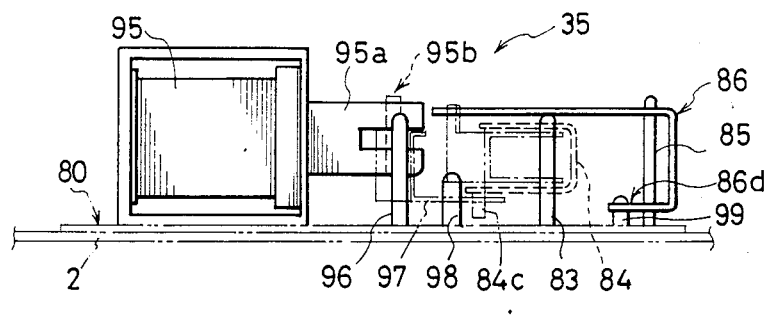
Figure 9C:
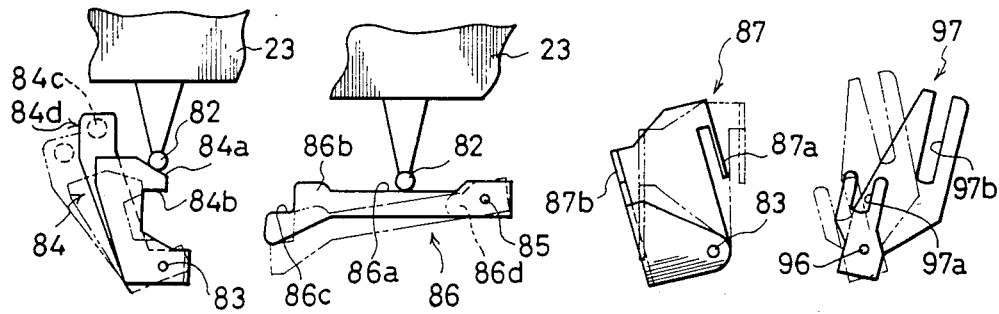
FIG. 9C illustrates portions of the component members of the detecting mechanism.

As shown in FIGS. 9A to 9C, the detecting system 35 comprises: an attaching plate 80 fixed on the chassis 2; a detecting switch 81 fixedly attached to the attaching plate 80; a pin member 82 fixedly mounted on the rear end portion of the tray 23; a stopping member 84 which is oscillatingly supported by a supporting device 83 fixedly formed on the attaching plate 80, and which can oscillate counterclockwise in FIG. 9A since the pin member 82 engages an engaging portion 84a immediately before the disc supporting portion 19 is enclosed in the housing 3; a swinging member 86 which is oscillatingly supported by the supporting device 85 fixedly formed on the attaching plate 80, and which can oscillate counterclockwise around the supporting device 85 since when the disc supporting portion 19 is enclosed in the housing 3, an abutting portion 86a is pressed by the pin member 82; and operating member 87, which is oscillatingly mounted around the supporting device 83, is formed in such a manner that its pressing portion 87a may abut on a non-pressing portion 81a of the detecting switch 81 upon oscillation; first biasing means (not shown) such as a spring or the like for applying the load clockwise in FIG. 9A around each of the supporting devices 83 and 85 to the swinging member 86 and the operating member 87; and resetting means 88 for cancelling the engaging stage of the pin member 82 and the stopping member 84.

The resetting means 88 comprises: a plunger 95 which is made operative (in the direction indicated by an arrow C in FIG. 9A and in the opposite direction) in response to the operation signal; a coupling member 97 oscillatingly supported by a supporting device 96 fixedly formed on the attaching plate 80; second biasing means (not shown) such as a spring or the like for applying a load clockwise in FIG. 9A to the coupling member 97; and a restricting member 98 which is fixedly formed at a predetermined location on the attaching plate 80 and which restricts the oscillation of the coupling member 97 due to the second biasing means (not shown). The coupling member 97 is formed with a first engaging portion 97a adapted to slidably engage a pin 95b formed on an output shaft 95a of the plunger 95 and a second engaging portion 97b adapted to slidably engage a columnar projection 84c formed on the lower surface of the stopping member 84.

A stopping portion 86b is formed on the swinging member 86. When the detecting system 35 is in the still condition (the state shown in FIGS. 9A and 9B), the stopping portion 86b engages an engaging portion 87b of the operating member 87, thereby restricting the clockwise (in FIG. 9A) oscillation of the operating member 87 due to the first biasing means (not shown). The engagement of stopping portion 86b and engaging portion 87b is cancelled when the pin member 82 engages the swinging member 86 for allowing this to oscillate. Restricting portions 86c and 86d respectively engage the engaging portion 87b of the operating member 87 and a stopping protrusion 99 formed on the attaching plate 80, thereby restricting the clockwise (in FIG. 9A) oscillation of the swinging member 86.

As shown in FIG. 9C, the stopping member 84 is formed with a stopping portion 84b and an engaging portion 84d. The stopping portion 84b engages the pin member 82, thereby locking the forward motion (in the direction opposite to the arrow A) of the disc supporting portion 19. When the resetting means 88 operates and the stopping member 84 is oscillated counterclockwise (in FIG. 9A) around the supporting device 83, the engaging portion 84d engages the engaging portion 87b of the operating member 87.

When the pin member 82 engages the swinging member 86, the engaging portion 84a of the stopping member 84 disengages the pin member 82. Thus, the stopping member 84 is oscillated clockwise in FIG. 9A in cooperation with the operating member 87 by the first biasing means (not shown) through the operating member 87, and by the second biasing means (not shown) through the coupling member 97. Finally, the stopping member 84 returns from the oscillating state (when it is in the operative location) to the original still location. At this time, the operating member 87 acts to make the detecting switch 81 operative.

Figure 7:
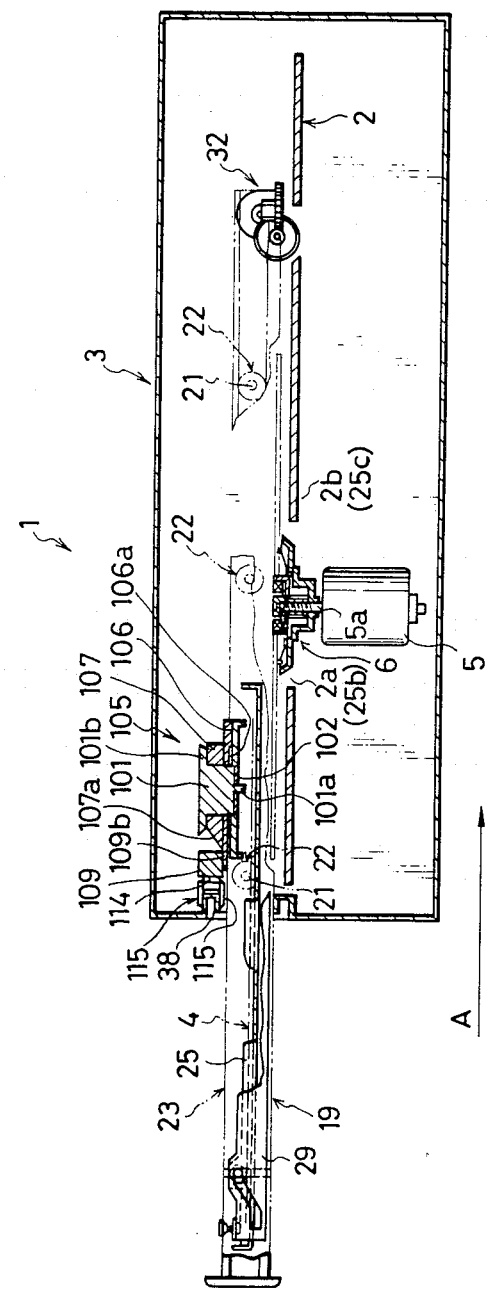
FIG. 7 is a right side elevational view with a part cut away of the above-mentioned internal construction.

Referring now to FIG. 7, a clamper 101 which acts as a disc pressing member, is shown. A ring-like magnetic member 102 is attached to the bottom surface of the clamper 101. At the central portion of the bottom surface of the clamper 101, a projecting portion 101a is formed downward which passes through the central hole of the magnetic member 101 and is able to insert into the concave portion 9a in the supporting member 9, which is one of the constructional members of the turntable 6. This projecting portion 101a may be preferably formed by a separate member made of non-magnetic material.

A reference numeral 105 indicateds a clamper supporting mechanism which holds the clamper 101 to a location spaced only a predetermined distance from the disc supporting surface 25a of the container 25 when the disc supporting portion 19 projects from the housing 3, and which allows the clamper 101 to move near the turntable 6 when the disc supporting portion 19 is enclosed in the housing 3.

As can be seen in FIGS. 2 and 7, the clamper supporting mechanism 105 comprises: a lift cam 107 mounted on a supporting plate 106 which is mounted on the upper surface of the tray 23 in the lateral direction perpendicular to the moving direction of the container 25 and both ends of which are fixed to the tray 23; a swinging member 109 oscillatingly supported by a supporting device 108 fixedly formed on the supporting plate 106; and a coil spring 110 for applying a load counterclockwise (in FIG. 2) to the swinging member 109, one end of the coil spring being coupled to the supporting plate 106 and the other end thereof being coupled to the swinging member 109. A tapered cam portion 107a is formed at the front portion of the lift cam 107. A groove portion 109a (or a through hole) is formed in the lower surface of the swinging member 109. A columnar member 111 fixedly formed on the supporting plate 106 is inserted into this groove portion 109a, thereby causing the oscillation of the swinging member 109 around the supporting device 108 to be restricted in a fixed range.

The clamper 101 is vertically and and rotatably slidably inserted into a clamper supporting portion 109b mounted to the swinging member 109. The clamper supporting portion 109b is adapted to fit into a concave portion 106a formed in the supporting plate 106.

The clamper 101 is also formed at its upper peripheral end portion with an engaging portion 101b adapted to engage the cam portion 107a of the lift cam 107.

On the other hand, a roller 114 adapted to engage an engaging surface 109c of the swinging member 109 is rotatably attached through a fixing member 115 to the receiving portion 38 formed in the inserting hole 24.

As shown in FIGS. 1 and 2, two concave portions 117 and 118 for removing the disc are formed in the tray 23 at predetermined locations at the periphery of the disc 4 when it has been positioned by being inserted into the through hole 23c of the tray 23. Each of these concave portions 117 and 118 has such a predetermined dimension that, for instance, the thumb or any two fingers except the thumb of the user of the present front loading disc player can be inserted therein. The concave portions 117 and 118 have symmetrical shapes and are formed at locations symmetrically with respect to the central axis in the longitudinal direction of the disc 4 which has been positioned.

Two opening portions 119 and 120 having predetermined dimensions are also similarly formed in the container 25 at the locations corresponding to the concave portions 117 and 118, respectively.

Although it is not shown, means for applying the forward load to the disc supporting portion 19 is provided when the disc supporting portion 19 is enclosed in the housing 3.

Next, the operation of the front loading disc player with the above-described construction will be explained in accordance with the operational procedures with reference to the drawings.

The knob plate 37 of the tray 23 is first pulled out forward using a finger or the like, so that the tray 23 slides on the guide roller 22, allowing the disc supporting portion 19 to protrude to the outside of the housing 3. In this state, the disc 4 is inserted into the through hole 23c formed in the tray 23 to be supported on the disc supporting surface 25a of the container 25. In this case, to protect the information recorded surface of the disc 4, it is desired that the disc is carefully handled in such a manner as to grip the portion between the central hole 4a of the disc 4 and the peripheral portion thereof by the finger.

After making sure that the disc 4 has been inserted into the through hole 23c of the tray 23 and supported on the disc supporting surface 25a of the container 25, the knob 37 of the tray 23 is pushed to enclose the disc supporting portion 19 into the housing 3.

Upon starting the enclosing operation of the disc supporting portion 19 in the housing 3, the swinging member 109, which is one of the constructional members of the clamper supporting mechanism 105, is oscillated counterclockwise in FIG. 2 around the supporting device 108 due to the spring load by the coil spring 110. When the swinging member 109 is oscillated, the clamper 101 removes from the lift cam 107 and is moved toward substantially the center of the disc 4. When the clamper 101 moves on the center of the disc 4, the end portion of the groove portion 109a formed in the swinging member 109 abuts on the columnar member 111 formed on the supporting plate 106, thereby restricting the oscillation of the swinging member 109.

Since the clamper 101 slides downward against the clamper supporting portion 109b in association with the above-mentioned oscillation of the swinging member 109, when it moves on the center of the disc 4, it is mounted on the disc 4.

As will be obvious in FIG. 9, the pin member 82 formed at the rear end portion of the tray 23 engages the engaging portion 84a of the stopping member 84, which is one of the constructional members of the detecting system 35, immediately before the disc supporting portion 19 is enclosed in the housing 3. Thus, the stopping member 84 is oscillated from the state indicated by the solid line in FIG. 9C to the state indicated by the alternate long and two short dashes line.

Further depressing the knob 37 causes the pin member 82 to engage the abutting portion 86a of the swinging member 86, thereby allowing the swinging member 86 to oscillate from the state indicated by the solid line to the state indicated by the alternate long and two short dashes line as shown in FIG. 9C. The oscillation of the swinging member 86 releases the stopping condition of the engaging portion 87b of the operating member 87 due to the stopping portion 86b of the swinging member 86. Thus, the operating member 87 is oscillated from the state indicated by the solid line to the state indicated by the alternate long and two short dashes line due to the first biasing means (not shown). Then, the pressing portion 87a of the operating member 87 abuts on the non-pressing portion 81a of the detecting switch 81 and push it, so that the detecting switch 81 is made operative.

On the other hand, when the pin member 82 engages the swinging member 86, the engaging portion 84a of the stopping member 84 disengages the pin member 82. Therefore, the stopping member 84 returns from the state indicated by the alternate long and two short dashes line to the state indicated by the solid line in association with the operating member 87 through the operating member 87 and the coupling member 97 by the first and second biasing means, respectively. At this time, the pin member 82 engages the stopping portion 84b of the stopping member 84, causing the pin member 82, therefore, and the disc supporting portion 19 to be locked.

In the state where the disc supporting portion 19 is enclosed in the housing 3, the small gear part 77 of the double gear 76, which is a constructional member of the power supplying device 32, engages the large gear part 53 of the double gear 55, which is a constructional member of the link portion 31. Thus, when the driving motor 70 of the power supplying device 32 starts rotating in the forward direction (the counterclockwise direction in FIG. 4) in accordance with the signal from the detectng switch 81, the swinging member 51 of the link portion 31 is oscillated counterclockwise in FIG. 2 around the supporting device 49 through the first spur gear 71, second spur gear 73, worm gear 74, double gear 76, and double gear 55.

Then, as will be obvious particularly in FIGS. 10 and 11, since the columnar projection 60 formed on the lower surface of the movable member 61 is inserted into the cam hole 65 formed in the swinging member 51, the columnar projection 60 is pressed by the cam surface 65a of the cam hole 65 in association with the oscillation of the swinging member 51. Thus, the movable member 61 moves in the longitudinal direction (downward in FIGS. 2 and 10) of the longitudinal member 50 along the through hole 64 formed in the longitudinal member 50 against the biasing force due to the coil spring 62. When the swinging member 51 oscillates for only a predetermined amount and the rear end portion (on the side indicated by the arrow A) of the cam hole 65 abuts on the columnar projection 60, almost simultaneously the columnar projection 59 formed on the upper surface of the movable member 61 reaches the coupling portion of the short-length portion 63a and the long-length portion 63b of the substantially L-shaped through hole 63 formed in the tray 23. Consequently, the longitudinal member 50 is released from its locked condition and can be rotated around the supporting device 49.

When the swinging member 51 is further oscillated, the rear end portion of the through hole 65 of the swinging member 51 presses the columnar projection 60. Therefore, the longitudinal member 50 starts rotating counterclockwise in FIGS. 2 and 10 around the supporting device 49 through the movable member 61. Upon starting rotation of the longitudinal member 50, the first and second cam members 28 and 29 are moved forward and backward, respectively. Thus, a pair of engaging members 44 fixedly mounted to the left end of the container 25 slide along the cam holes 40 and 41 which are formed on the first cam member 28 and the groove 23d formed in the inner surface on the side portion of the tray 23; similarly, a pair of engaging members 45 fixedly mounted to the right end of the container 25 slide along the cam holes 42 and 43 which are formed on the second cam member 29 and the groove 23d formed in the inner surface on the side portion of the tray 23, respectively. Thus, the container 25 moves downward due to its tare weight while supporting the disc 4. The clamper 101 also slides downward against the clamper supporting portion 109b in association with the movement of the container 25.

The central hole 4a of the disc 4 engages the tapered portion 10a of the sliding member 10, which is one of the constructional members of the turntable 6, due to the downward movement of the container 25, so that the disc 4 is guided to the performance location and is positioned and mounted on the turntable 6. Almost at the same time when the disc 4 is mounted on the turntable 6, an attraction force is caused due to a magnetic force between the magnetic member 102 attached to the clamper 101 and the ring-like magnet 8 attached to the supporting member 9, which is one of the constructional members of the turntable 6. This allows the disc 4 to move together with the clamper 101 and the sliding member 10 against a biasing force due to the coil spring 11 until the disc 4 abuts on the disc supporting member 7. during this moving step, the disc 4 abuts the rubber members 145 to cause the cup spring 13 to be deformed, so that in the state where the disc 4 abuts on the disc supporting member 7, the rubbers 14 are pressed to the disc 4 due to the cup spring 13.

In this way, the disc 4 is clamped on the turntable 6. At this time, since a sufficient friction force acts between the rubbers 14 and the disc 4, the disc 4 is positively driven in response to the rotation of the turntable 6. In this state, the performance of the disc 4 is started.

Upon completion of performance, when an operation signal is generated to return the disc 4 to the outside of the housing 3, the driving motor 70 starts rotating in the reverse direction (clockwise in FIG. 4), and causes the swinging member 51 of the link portion 31 to be oscillated clockwise in FIGS. 2 and 10. Thus, the front end portion (on the side oposite to the arrow A) of the through hole 65 of the swinging member 51 abuts on the columnar projection 60 of the movable member 61. After the front end portion of the through hole 65 has abut on the columnar projecton 60, the swinging member 51 is also further oscillated and the front end portion of the through hole 65 presses the columnar projection 60. Thus, the longitudinal member 50 starts rotating clockwise in FIGS. 2 and 10 around the supporting device 49 through the movable member 61. Then, each of the first and second cam members 28 and 29 is moved backward and forward, respectively, and this permits the container 25 to start moving upward according to the process opposite to the downward movement.

The clamper 101 moves upward against the clamper supporting portion 109b through the disc 4 in association with the upward movement of the container 25. Hence, the clamping state of the disc 4 due to the clamper 101 is released.

Almost simultaneously upon completion of upward movement of the container 25, the columnar projection 59 formed on the upper surface of the movable member 61 reaches the coupling portion of the short-length portion 63a and the long-length portion 63b of the substantially L-shaped through hole 63, so that the movable member 61 moves in the longitudinal direction (upward in FIGS. 2 and 10) of the longitudinal member 50 along the through hole 64 formed in the longitudinal member 50 due to the biasing force by the coil spring 62.

In this way, the longitudinal member 50 (accordingly, the link portion 31) is locked.

When the link portion 31 is locked, the plunger 95 of the detecting system 35 then operates in the direction indicated by the arrow C in FIG. 9.

Due to this operation of the plunger 95, as shown in FIG. 9C, the coupling member 97 is actuated from the state indicated by the solid line to the state indicated by the alternate long and two short dashes line against the biasing force by the first biasing means (not shown). At this time, since the columnar projection 84c of the stopping member 84 engages the second engaging portion 97b of the coupling member 97, the stopping member 84 is oscillated form the state indicated by the solid line to the state indicated by the alternate long and two short dashes line. Thus, the pin member 82 disengages the stopping member 84. At the same time, the pin member 82 also disengages the swinging member 86 for allowing the swinging member 86 to be returned from the state indicated by the alternate long and two short dashes line to the state indicated by the solid line due to the biasing force by the second biasing means.

On the other hand, since the engaging portion 84d of the swinging member 84 presses the engaging portion 87b of the operation member 87 upon the oscillation of the stopping member 84, the operation member 87 is oscillated from the state indicated by the alternate long and two short dashes line to the state indicated by the solid line. Thus, the operational state of the detecting switch 81 is cancelled.

When the energization to the plunger 95 is cut off, the stopping member 84 and the coupling member 97 are returned from the state indicated by the alternate long and two short dashes line to the state indicated by the solid line due to the biasing force by the first biasing means(not shown), this causes the detecting system 35 to return to the original still state.

The disc supporting portion 19 which has disengaged the stopping member 84 is pressed forward by the load applying means (not shown), so that it is pushed slightly out of the housing 3. Thereafter, by drawing the plate 37 of the tray 23 in the forward direction using a finger or the like, the disc supporting portion 19 protrudes to the outside of the housing 3.

As shown in FIG. 2, in the step of protrusion of the disc supporting portion 19 to the outside of the housing 3, the engaging surface 109c of the swinging member 109, which is one of the constructional member of the clamper supporting mechanism 105, comes into engagement with the roller 114 attached to the receiving portion 38 of the inserting hole 24, so that the swinging member 109 is oscillated clockwise in the drawing against the spring load force due to the coil spring 110 around a pivotal point numbered 108. Then, as shown in FIG. 7, the engaging portion 101b of the clamper 101 engages the cam portion 107a of the lift cam 107 and the clamper 101 is, therefore, removed and moves upward against the clamper supporting portion 109b of the swinging member 109 while sliding on the cam portion 107a in association with the above-mentioned oscillation of the swinging member 109.

Almost simultaneously upon completion of protrusion of the disc supporting portion 19 to the outside of the housing 3, the upward movement of the clamper 101 is also finished, and the clamper supporting portion 109b of the swinging member 109 fits into the concave portion 106a of the supporting plate 106.

Figure 8:
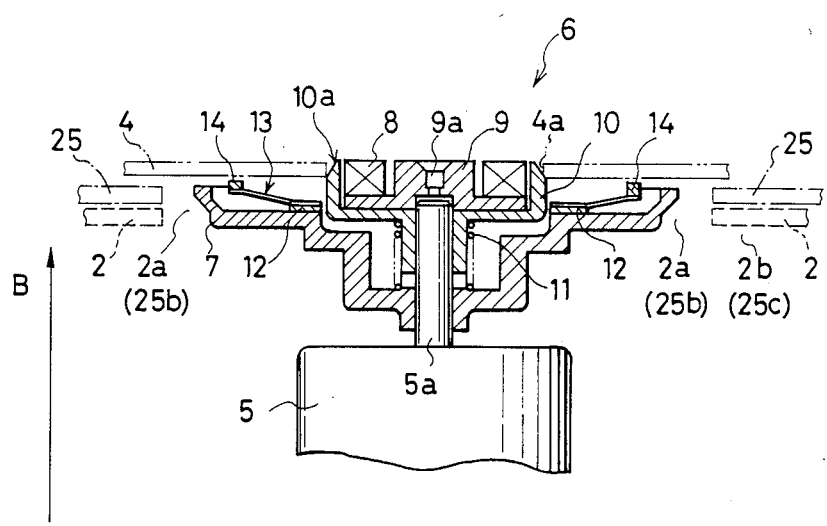
FIG. 8 is a cross sectional view showing a turntable.

Since the clamper 101 is removed, as shown in FIG. 8, the disc 4 and the sliding member 10 are returned to the state before clamping due to the biasing force by the coil spring 11 and the rubbers 14 are also returned to the original state due to the recovery force of the cup spring 13.

The disc 4 is now removed form the disc supporting portion 19 projecting outside of the housing 3. At this time, the disc 4 is supported on the disc supporting surface 25a of the container 25 in the state that it falls for only a predetermined distance from the upper surface of the tray 23. In addition, the concave portions 117 and 118 are formed in the tray 23 for easy collection of the disc, and each of them has a proper dimension so as to be inserted by the thumb or any two fingers except the thumb of the user of this disc player; therefore, the disc 4 may be easily removed from the tray 23 without gripping the information recording surface of the disc by the fingers. That is to say, the user may collect the disc 4 by gripping between the central hole 4a of the disc 4 and its peripheral portion by the fingers.

After removing the disc 4, the plate 37 is pressed again to enclose the disc supporting portion 29 in the housing 3.

As described in detail above, the disc, such as a video disc or a digital audio disc or the like, which has been enclosed in the player housing is automatically carried to the performance location with the aid of the disc carrying system according to the present invention; this results in omission of the annoying procedure for disc loading.

The disc carrying system according to the present invention particularly utilizes a cam mechanism and is constructed in such a manner as to carry the disc into the performing apparatus with the aid of driving operation of the cam mechanism. The cam mechanism has such a simple structure that the disc carrying system according to the present invention will not be subject to troubles.

Moreover, since the cam mechanism is of relatively low cost, the disc carrying system of the present invention may be also manufactured at a lost cost.

Furthermore, in the disc player to which the disc carrying system of the present invention is applied, as described previously, at least one (two, in this embodiment) concave portion(s) for detachment of the disc is(are) formed in each of the tray and disc supporting portion. Therefore, it is impossible to easily remove the disc from the player, thereby providing such an advantage that a secretion from the fingers (i.e. oil and fat or the like) and dust or dirt may be prevented from being attached on the information recording surface of the disc.

What is claimed is:

1. A disc carrying system to be mounted in a housing of a front loading disc player for supporting a disc in an initial position and for moving said disc through an opening in said housing in a first predetermined direction and in a second predetermined direction perpendicular thereto, thereby carrying it to a final position located at a distance from the initial position, said system comprising:
   (a) a tray which is slidably mounted for movement in said first predetermined direction through a path defined by a pair of laterally spaced rails facing each other and which positions said disc to said final position;
   (b) a plate formed on an end of said tray functioning as a lid for the aperture in said housing when said tray is enclosed in said housing;
   (c) a disc-supporting container carried by said tray and which can protrude to the outside of said housing together with said tray and which supports the disc in cooperation with said tray;
   (d) at least a pair of cam members carried by said tray and disposed on both sides of said tray, each of which cam members has a cam slot having edges which engage with engaging members carried by said container, said cam members being mounted for movement in said first predetermined direction with respect to said tray; and
   (e) drive means for driving said cam members in said first predetermined direction, said cam slots being formed so as to move said container in said second predetermined direction perpendicular to said first predetermined direction with respect to said tray in association with the movement of said cam members by said drive means in said first predetermined direction.

2. A disc carrying system according to claim 1 wherein said tray is provided with at least one concave portion having a predetermined dimension, at a location corresponding to the position of the peripheral portion of said disc when the disc is supported by said tray.

3. A disc carrying system according to claim 1, wherein one of said pair of cam members is formed with a pair of cam slots with the same shapes at predetermined spaced locations in the front and rear portions thereof, each of said cam slots having horizontal portions which are parallel to the moving direction of said first cam member and a slant portion which communicates with said horizontal portions and which inclines downward from a forward to a rearward direction, and wherein the other cam member is also formed with a pair of cam slots with the same shapes at predetermined spaced locations in the front and rear portions, each of said cam slots in the second cam member having horizontal portions which are parallel to the moving direction of said second cam member and a slant portion which communicates with said horizontal portions and which inclines upward from the forward to the rearward directions.

4. A disc carrying system as set forth in claim 1, further comprising:
a rotatable turntable carried by said tray;
a clamper engageable and rotatably with said turntable for driving a disc disposed in said housing;
a clamper support member for rotatable supporting said clamper, said clamper support member being carried by said tray and movable relative to said tray between a rest position and an operating position in which said clamper is engageable with said turntable; and
means for positioning said clamper support member at said operating position when said tray is moved along said first predetermined direction, so that said disc is clamped between said clamper and said turntable when said disc is carried to said final position by the movement of said tray along said first predetermined direction and by subsequent movement of said container along said second predetermined direction.

5. A disc carrying system as set forth in claim 4, wherein said clamper is a cylindrical member having an upper flange and having a lower flange to face said turntable, said clamper support member is a swing arm pivotally supported on said tray and swingable between said rest position and said operating position and having an end with a circular hole for receiving a cylindrical body of said clamper and at the same time permitting rotation of said clamper about an axis of rotation and a slide movement thereof along said axis of rotztion, and wherein a generally U-shaped member of a predetermined thickness having guide ramps provided at each end of two legs thereof and an upper face both contactable with said upper flange of said clamper is provided at said rest position of said clamper support member in such a manner as to receive said cylindrical body of said clamper between the two legs thereof, whereby said clamper is moved away from said turntable along said axis of rotation by means of the contact of said ramp portion and subsequently of the upper face of said U-shaped member with said upper flange of said clamper when said clamper support member is moved back to said rest position.

6. A disc carrying system to be mounted in a housing of a front loading disc player for supporting a disc in an initial position and for moving said disc in a first predetermined direction and in a second predetermined direction perpendicular thereto, thereby carrying it to a final position located at a distance from the initial position, said system comprising:
a tray which is slidably mounted for movement in said first predetermined direction through a path defined by a pair of laterally spaced rails facing each other and which positions said disc to said final position;
a disc supporting container carried by said tray and which can protrude to the outside of said housing together with said tray and which supports the disc in cooperation with said tray;
at least a pair of cam members carried by said tray and disposed on both sides of said tray, each of which cam members has a cam slot having edges which engage with engaging members carried by said container, said cam members being mounted for movement in said first predetermined direction with respect to said tray; and
drive means for driving said cam members in said first predetermined direction, said cam slots being formed so as to move said container in said second predetermined direction perpendicular to said first predetermined direction in association with the movement of said cam members by said drive means in said first predetermined direction,
wherein one of said pair of cam members is formed with a pair of cam slots with the same shapes at predetermined spaced locations in the front and rear portions thereof, each of said cam slots having horizontal portions which are parallel to the moving direction of said first cam member and a slant portion which communicates with said horizontal portions and which inclines downward from a forward to a rearward direction, and wherein the other cam member is also formed with a pair of cam slots with the same shapes at predetermined spaced locations in the front and rear portions, each of said cam slots in the second cam member having horizontal portions which are parallel to the moving direction of said second cam member and a slant portion which communicates with said horizontal portions and which inclines upward from the forward to the rearward directions, and wherein said drive means for driving the cam members comprises a link portion pivotally mounted to the rear portion of said tray and having ends pivotally connected to respective ends of said cam members, and power supplying means fixed to a predetermined location on a chassis attached to said housing of the disc player for engaging and pivoting the link portion so that said cam members are driven by said link portion.

7. A disc carrying system according to claim 6 further comprising container drive means which includes: detecting means for applying a detection signal to said power supplying means by detecting that said disc supporting portion has been enclosed in said player housing; link means including said pair of cam members and said link portion; and said power supplying means.

8. A disc carrying system according to claim 7, wherein said power supplying means comprises: a driving motor fixedly mounted to said chassis; a first spur gear attached to an output shaft of said driving motor; a second spur gear rotatably supported by supporting means fixedly attached to the chassis for engaging said first spur gear; a worm gear which is rotatably supported by said supporting means and which is fixedly attached to or integrally formed with the second spur gear; and a double gear rotatably supported by supporting means fixedly attached to the chassis, said double gear drivingly engagable with said link means.

9. A disc carrying system according to claim 7, wherein said link portion further includes a lock means comprising: a flat plate-like movable member which is formed with columnar projections on its upper and lower surfaces and which is movably mounted in the longitudinal direction of a longitudinal member; a coil spring for applying a longitudinal load to said movable member, one end of said spring being coupled to said movable member and the other end being coupled to said longitudinal member; a substantially L-shaped through hole formed at a predetermined location of said tray and through which one of said columnar projections extends; a through hole formed in said longitudinal member substantially parallel to the longitudinal direction thereof and through which another of said columnar projections extends; and a swinging member having a substantially open fan-like cam hole and into which said another columnar member extends and which has a cam surface adapted to abut on said columnar member, said lock means being operative to lock said link portion.

* * * * *